United States Patent
Jilani

(10) Patent No.: US 9,612,872 B2
(45) Date of Patent: Apr. 4, 2017

(54) DATA PLANE RESOURCE ALLOCATION

(71) Applicant: Jaffar Hameed Abdul Kather Jilani, San Jose, CA (US)

(72) Inventor: Jaffar Hameed Abdul Kather Jilani, San Jose, CA (US)

(73) Assignee: Ciena Corporation, Hanover, MD (US)

(*) Notice: Subject to any disclaimer, the term of this patent is extended or adjusted under 35 U.S.C. 154(b) by 0 days.

(21) Appl. No.: 14/843,626

(22) Filed: Sep. 2, 2015

(65) Prior Publication Data

US 2017/0060632 A1 Mar. 2, 2017

(51) Int. Cl.
*G06F 9/50* (2006.01)

(52) U.S. Cl.
CPC ..................... *G06F 9/50* (2013.01)

(58) Field of Classification Search
None
See application file for complete search history.

(56) References Cited

U.S. PATENT DOCUMENTS

| | | | | |
|---|---|---|---|---|
| 6,061,349 A * | 5/2000 | Coile | ................... | H01R 31/005 370/389 |
| 8,054,832 B1 * | 11/2011 | Shukla | .................... | H04L 45/00 370/230 |
| 2002/0057684 A1 * | 5/2002 | Miyamoto | .......... | H04L 12/1886 370/386 |
| 2002/0129216 A1 * | 9/2002 | Collins | ................. | G06F 3/0608 711/170 |
| 2004/0187106 A1 * | 9/2004 | Tanaka | .................. | G06F 9/5077 718/1 |
| 2004/0193739 A1 * | 9/2004 | Shimizu | .................. | G06F 21/78 710/1 |
| 2005/0050085 A1 * | 3/2005 | Shimada | ................ | G06F 3/0605 |
| 2005/0160222 A1 * | 7/2005 | Innan | .................... | G06F 3/0605 711/114 |
| 2011/0090911 A1 * | 4/2011 | Hao | ..................... | H04L 12/4633 370/395.53 |
| 2012/0269053 A1 * | 10/2012 | Yu | ....................... | H04L 12/4641 370/216 |
| 2013/0054763 A1 * | 2/2013 | Van Der Merwe | ..... | H04W 8/12 709/220 |
| 2013/0061047 A1 * | 3/2013 | Sridharan | ............ | H04L 45/586 713/162 |

* cited by examiner

*Primary Examiner* — Shih-Wei Kraft
(74) *Attorney, Agent, or Firm* — Osha Liang LLP

(57) ABSTRACT

A method for allocating data plane resources. The method allocates segments of hardware data plane resources to individual domains. In particular, in one or more embodiments, a new domain data plane request may request multiple segments of hardware data plane resources. In response to the request, a segment is reserved for a domain by assigning a domain identifier of the domain to the segment. Thus, the domain may use the allocated segment.

17 Claims, 7 Drawing Sheets

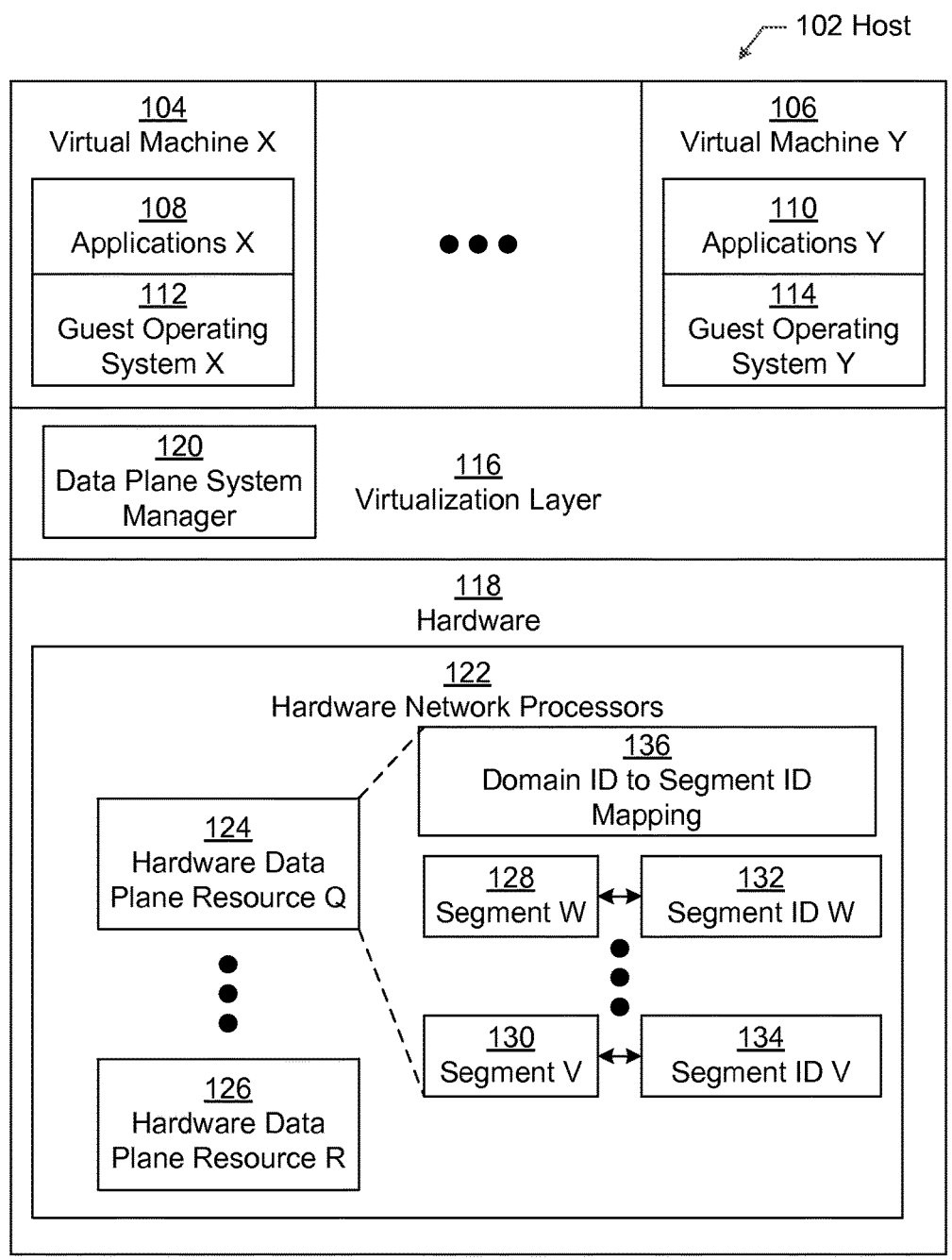
FIG. 1.1

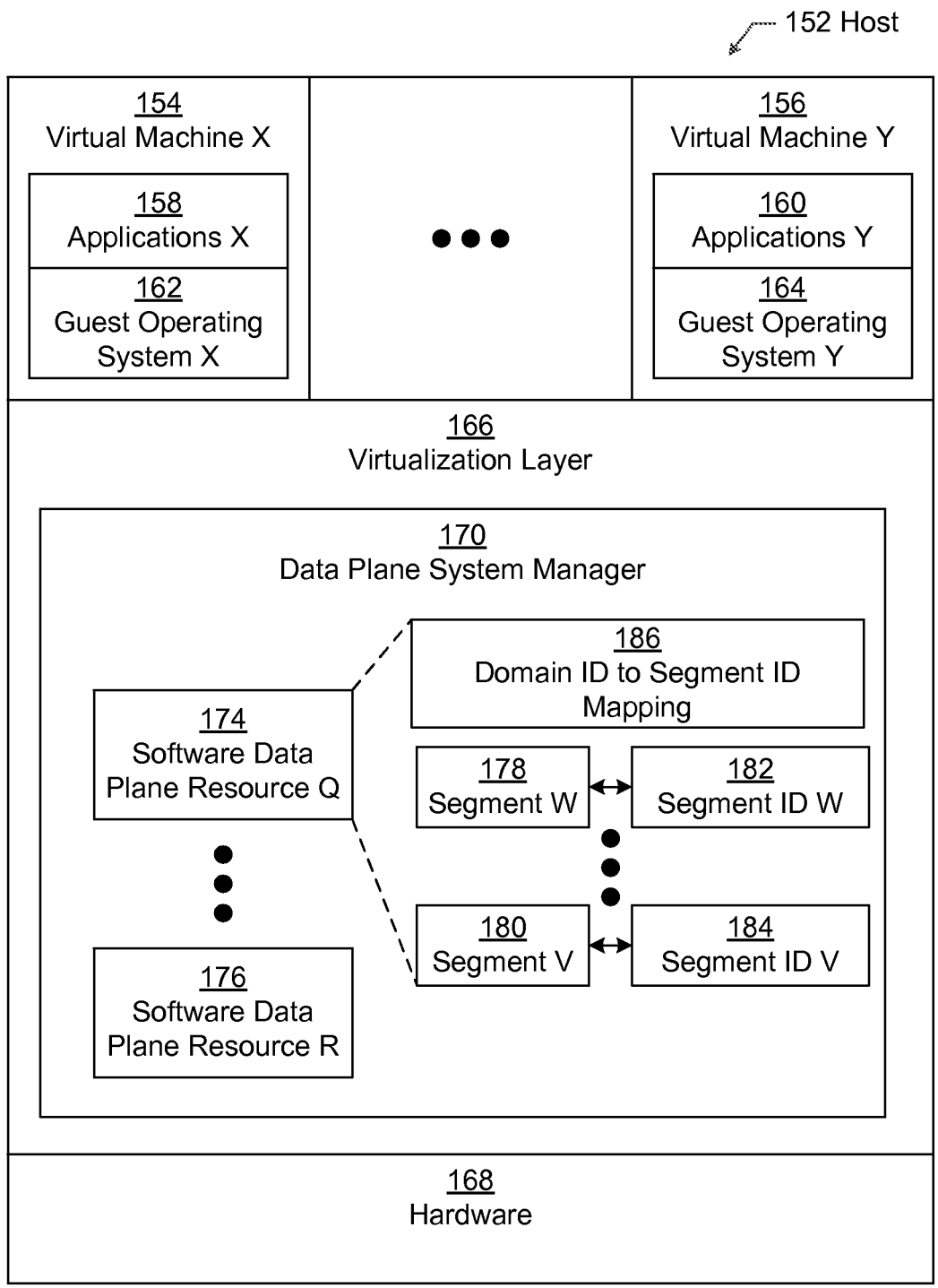
FIG. 1.2

DATA PLANE RESOURCE ALLOCATION

BACKGROUND

Virtualization of computing systems is the act of creating a virtual version from all or part of a computing system and creating a virtual form of the part or entire computing system. Different types of virtualization exist.

SUMMARY

In general, in one aspect, one or more embodiments relate to a method for data plane resource allocation. The method includes receiving, for a domain, a new domain data plane request, selecting, to satisfy the new domain data plane request, a segment in each of hardware data plane resources, and reserving the segment in each of the hardware data plane resources by assigning a domain identifier of the domain to the segment.

In general, in one aspect, one or more embodiments relate to a system for data plane resource allocation including hardware data plane resources, and a data plane system manager executing on a hardware network processor. The data plane system manager is configured to receive, for a domain, a new domain data plane request, select, to satisfy the new domain data plane request, a segment in each of hardware data plane resources, and reserve the segment in each of the hardware data plane resources by assigning a domain identifier of the domain to the segment.

In general, in one aspect, one or more embodiments relate to a non-transitory computer readable medium including computer readable program code for data plane resource allocation. The computer readable program code includes functionality for receiving, for a domain, a new domain data plane request, selecting, to satisfy the new domain data plane request, a segment in each of hardware data plane resources, and reserving the segment in each of the hardware data plane resources by assigning a domain identifier of the domain to the segment.

Other aspects of the invention will be apparent from the following description and the appended claims.

BRIEF DESCRIPTION OF DRAWINGS

FIGS. 1.1 and 1.2 show a schematic diagram of a system in accordance with one or more embodiments of the invention.

DETAILED DESCRIPTION

Figure 2:
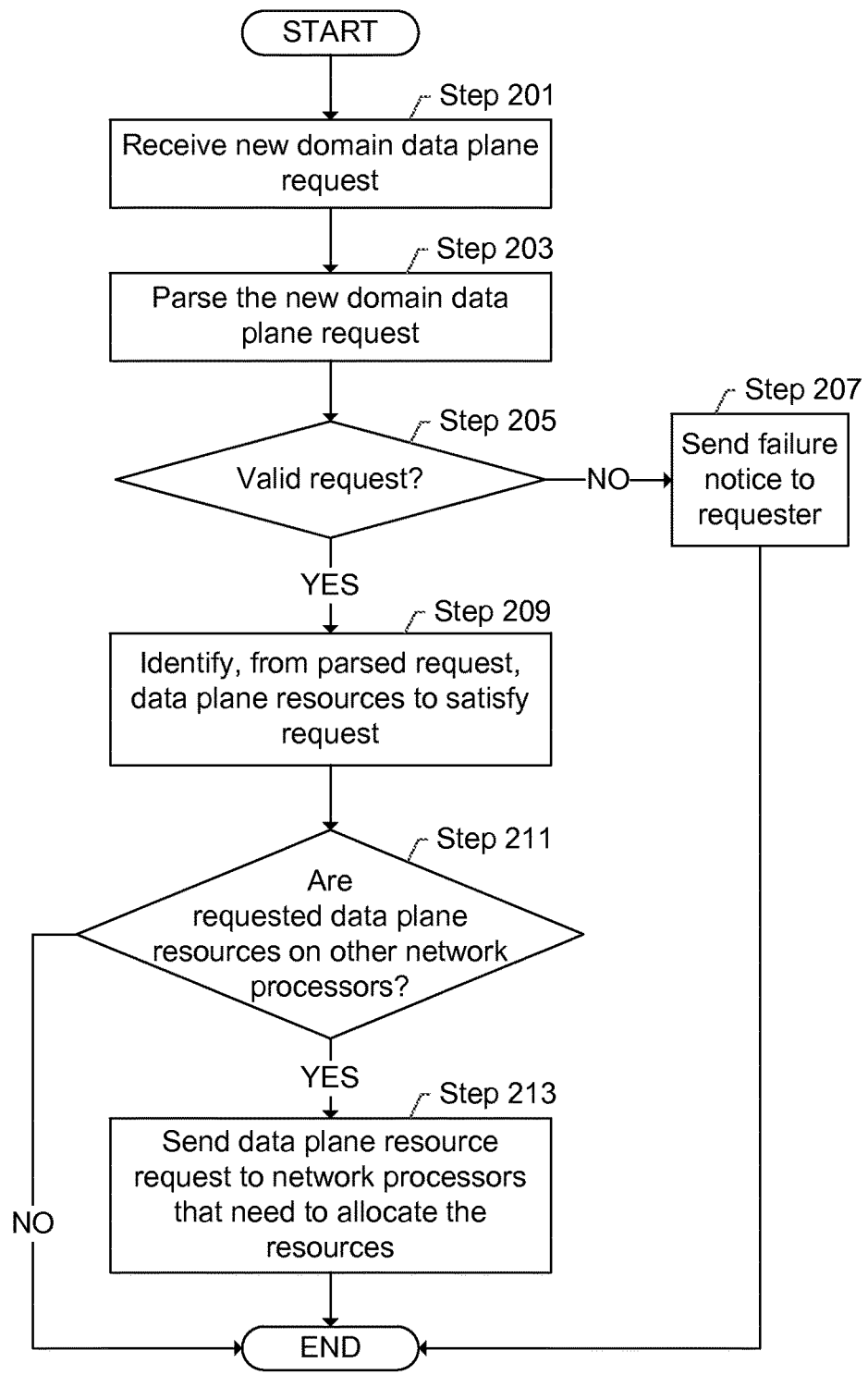
FIGS. 2, 3, and 4 show flowcharts in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to partitioning hardware data plane resources for a virtual environment. Thus, individual domains may be allocated a partition of the hardware, such that the partitions allocated to different domains do not overlap in hardware. By isolating the domains in the hardware data plane resources, one or more embodiment prevent nefarious software and hardware from accessing protected domains when packets are transmitted. In one or more embodiments, a new domain data plane request may request multiple portions of data plane resources. Accordingly, one or more embodiments select a segment in each of the multiple data plane resources and reserve the segment for the domain.

FIG. 1.1 shows a schematic diagram of a host (102) in accordance with one or more embodiments of the invention. A host (102) is any type of computing system or network device in accordance with one or more embodiments of the invention. For example, a host (102) may be a router, a switch, a server, or other computing device. As shown in FIG. 1.1, the host (102) includes virtual machines, a virtualization layer (116), and hardware (118). Each of these components is described below.

In one or more embodiments of the invention, virtual machines (e.g., virtual machine X (104), virtual machine Y (106)) are distinct operating environments configured to inherit underlying functionality of the host operating system via an abstraction layer. In one or more embodiments of the invention, each virtual machine (e.g., virtual machine X (104), virtual machine Y (106)) may include a separate instance of an operating system. The separate instances of the operating system may be the same type of operating system or different types of operating systems. Guest virtual machine operating systems (e.g., guest operating system X (112), guest operating system Y (114)) operate as if the guest virtual machine operating system (e.g., guest operating system X (112), guest operating system Y (114)) is the only operating system on the host and the resources (e.g., processor cycles, memory, etc.) allocated to the guest virtual machine are the only resources available on the host (102). Thus, the guest virtual machine operating system includes functionality to control the operating environment of applications (e.g., applications X (108), applications Y (110)) executing in the guest virtual machine using resources allocated to the guest virtual machine. Many different types of virtual machines exist, which may be used without departing from the scope of the invention.

In addition to the guest virtual machine (e.g., virtual machine X (104), virtual machine Y (106)), the host may include a virtualization layer. The virtualization layer (116) may correspond to a control virtual machine, a hypervisor, or other software that support the virtualization of resources. In one or more embodiments of the invention, a control virtual machine has a separate address space and operating system environment than the guest virtual machine, and may include functionality to configure a hypervisor, create, remove, and configure guest virtual machines, and perform the management of the host. A hypervisor includes functionality to control the sharing of hardware resources on the host. Specifically, the hypervisor includes functionality to virtualize the physical devices of the host so that more than one operating system may share the same physical device transparently in accordance with one or more embodiments of the invention. By way of an example, a hypervisor may be a thin-privileged layer of software that only manages which guest virtual machine or the host virtual machine is executing.

In one or more embodiments of the invention, the virtualization layer (116) includes a data plane system manager (120). The data plane system manager (120) is hardware, software, firmware or any combination thereof that includes functionality to configure and manage the hardware data plane resources (e.g., hardware data plane resource Q (124), hardware data plane resource R (126)) in accordance with one or more embodiments of the invention. For example, the data plane system manager (120) may be configured to allocate one or more sections of the hardware data plane resources (e.g., hardware data plane resource Q (124), hardware data plane resource R (126)) for a virtual machine (e.g., virtual machine X (104), virtual machine Y (106)).

Continuing with the host (102), the host (102) includes hardware (118) in accordance with one or more embodiments of the invention. The hardware (118) may include, for example, hardware network processors (122), and other hardware components, such as a central processing unit (CPU), memory, etc.

In one or more embodiments of the invention, a hardware network processor (122) is an integrated circuit that is specifically targeted toward performing networking functions. In one or more embodiments of the invention, a hardware network processor (122) is specifically designed for packet throughput. The hardware network processor (122) may include more than one processing core, dedicated hardware for specific networking functions, high-speed memory and input/output interfaces, and an interface to the CPU. Thus, a network processor (122) may be support, in hardware, router functionality, switch functionality, intrusion detection and/or prevention functionality, network monitoring, firewall functionality, and other functions.

In one or more embodiments of the invention, the hardware network processors (122) include hardware data plane resources (e.g., hardware data plane resource Q (124), hardware data plane resource R (126)). The hardware data plane resources (e.g., hardware data plane resource Q (124), hardware data plane resource R (126)) provide hardware for supporting the data plane. The data plane processing includes media access control (MAC), parsing, classification, transformation, and other functions.

MAC controls physical access to the physical network. For example, MAC includes serial-to-parallel conversion, synchronization, transferring data traffic into system memory. Parsing separates forwarding or classification information from the data unit of the packet and passes the classification information to the classification function. Classification determines the egress port, whether the data is management control information, priority, and filtering of the packet. A packet may be passed through a transformation layer that converts the data unit into another format or updating the header so that the packet may be forwarded to the egress port.

The data plane processing may further include traffic management to manage traffic on the network, topology management to maintain information about the network map and connectivity, signaling, and network management.

Continuing with FIG. 1.1, the hardware data plane resources are hardware resources to support the data plane. For example, the hardware data plane resources may include a collection of tables, meter profiles, backplane bandwidth, organizational elements (e.g., MAC learning, link state notifications, operations, administrative, and management (OAM), and other organizational tasks), egress ports, global resources (e.g., access control lists, quality of service, meters, stats, etc.), and other such resources. Further, the hardware data plane resources may span multiple line blades. A line blade is an individual blade in a chassis based network switch/router. Each line blade may consist of one or more network processors. Line blades are interconnected through a fabric. In other words, the fabric provides the physical interconnect between line blades.

Inside network processor or inside a software based forwarding plane, the resources (e.g., port, bandwidth, and other resources) are implemented as tables. Thus, when a packet received on a port, the network processor fetches port tables with corresponding rows, and obtains the port properties, which need to be applied in the packet. Thus, one or more embodiments of the invention have the domain associated with each row in that table, which can be applied in the packet as well.

Hardware data plane resources (e.g., hardware data plane resource Q (124), hardware data plane resource R (126)) may be partitioned into segments. Segments (e.g., segment W (128), segment V (130)) are discrete non-overlapping portions in a hardware data plane resource. In other words, segments do not overlap with each other. Further, the particular partitioning of segments may be defined in the hardware. In alternative embodiments, the partitioning is defined in software or firmware. The number of segments may vary between different hardware data plane resources (e.g., hardware data plane resource Q (124), hardware data plane resource R (126)). Similarly, the size of each segment may vary between different hardware data plane resources (e.g., hardware data plane resource Q (124), hardware data plane resource R (126)).

Each segment (e.g., segment W (128), segment V (130)) has a corresponding segment identifier (e.g., segment identifier W (132), segment identifier V (134)). The segment identifier is a unique identifier for the corresponding segment (e.g., segment W (128), segment V (130)). The identifier may be explicitly or implicitly associated with the segment. For example, in some embodiments, hardware storage exists on the hardware data plane resource (e.g., hardware data plane resource Q (124), hardware data plane resource R (126)) to store the segment identifier (e.g., segment identifier W (132), segment identifier V (134)). By way of another example, the segment identifier may be implicitly defined based on the location of the segment. By way of a more concrete example, the third segment from the top may have a corresponding unique identifier of three.

By way of an example in which the hardware data plane resource is a table, the table may include multiple entries, where each entry includes functionality to store at least one data unit of information. Entries may be grouped into segments (e.g., segment W (128), segment V (130)) in accordance with one or more embodiments of the invention. In one or more embodiments of the invention, each segment includes a contiguous set of entries.

In one or more embodiments of the invention, a hardware data plane resource may include a domain identifier to segment identifier mapping (136). In other words, the domain identifier to segment identifier mapping (136) provides a one to one mapping between domain identifier and segment identifier in accordance with one or more embodiments of the invention. A domain is a hardware representation of a virtual machine (e.g., virtual machine X (104), virtual machine Y (106)). In other words, a domain is a logical entity that defines a collection of resources. The domain identifier is a unique identifier of a domain.

FIG. 1.2 shows a schematic diagram of a system in accordance with one or more embodiments of the invention. In FIG. 1.2, host (152), virtual machine X (154), virtual machine Y (156), applications X (158), applications Y (160), guest operating system X (162), guest operating system Y (164), virtualization layer (166), and hardware (168) are the same or similar to the corresponding similarly named components in FIG. 1.1. In FIG. 1.2, the data plane system manager (170) includes software data plane resources (e.g., software data plane resource Q (174), software data plane resource R (176)) that include domain ID to segment ID mapping (186), segments (e.g., segment W (178), segment V (180)) and segment identifiers (e.g., segment ID W (182), segment ID V (184)). The software data plane resources (e.g., software data plane resource Q (174), software data plane resource R (176)) correspond to software resources that support the data plane. For example, the software resources may be virtual tables, such as a software based forwarding plane. Further, the domain ID to segment ID mapping (186) may be similar to the mapping in FIG. 1.1. Further, the segments (e.g., segment W (178), segment V (180)) correspond to a partitioning of the software data plane resources, and the segment identifiers (e.g., segment ID W (182), segment ID V (184)) uniquely identify the corresponding segments.

While FIGS. 1.1 and 1.2 show a configuration of components, other configurations may be used without departing from the scope of the invention. For example, various components may be combined to create a single component. As another example, the functionality performed by a single component may be performed by two or more components.

Figure 3:
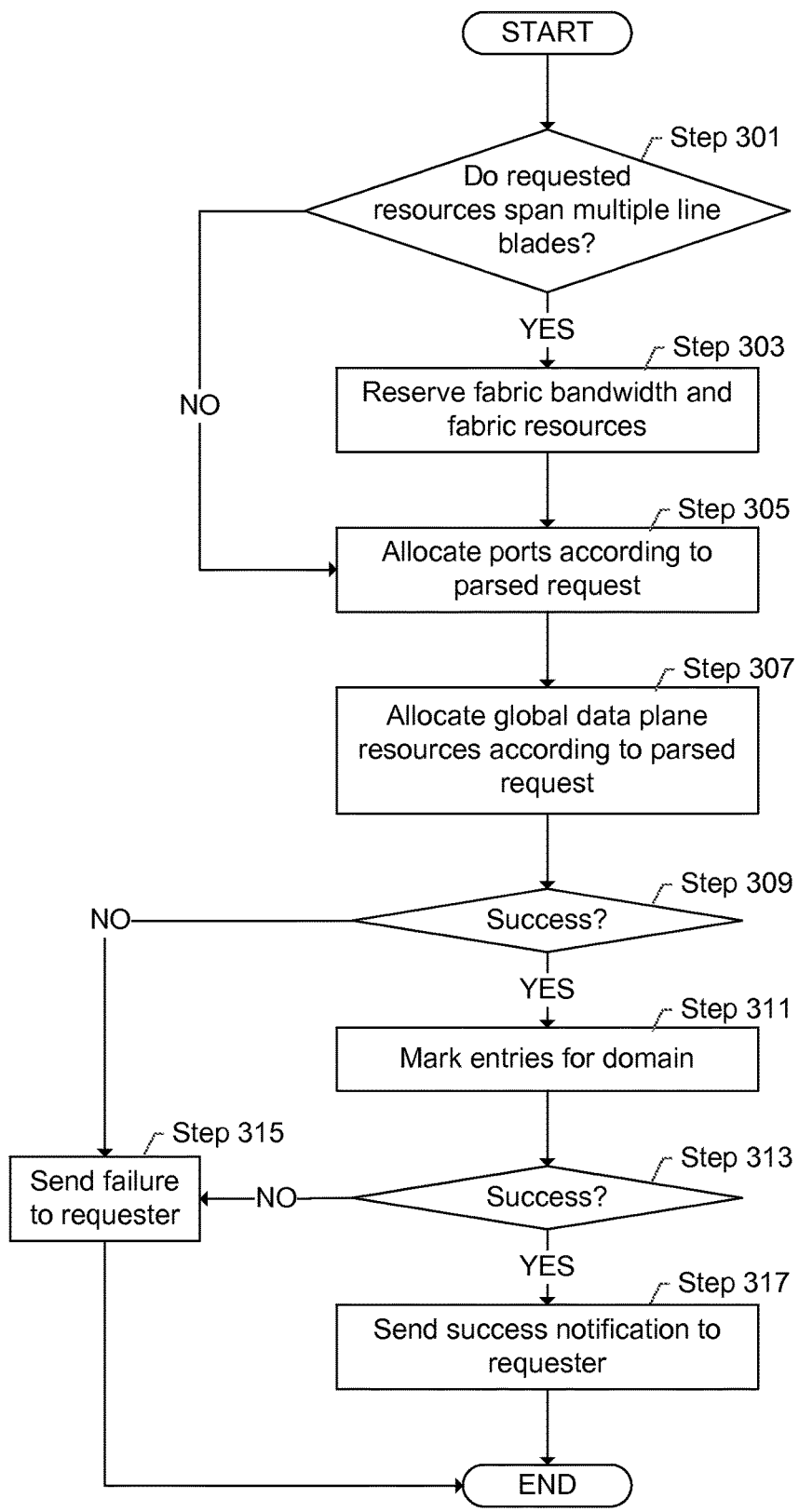
Figure 4:
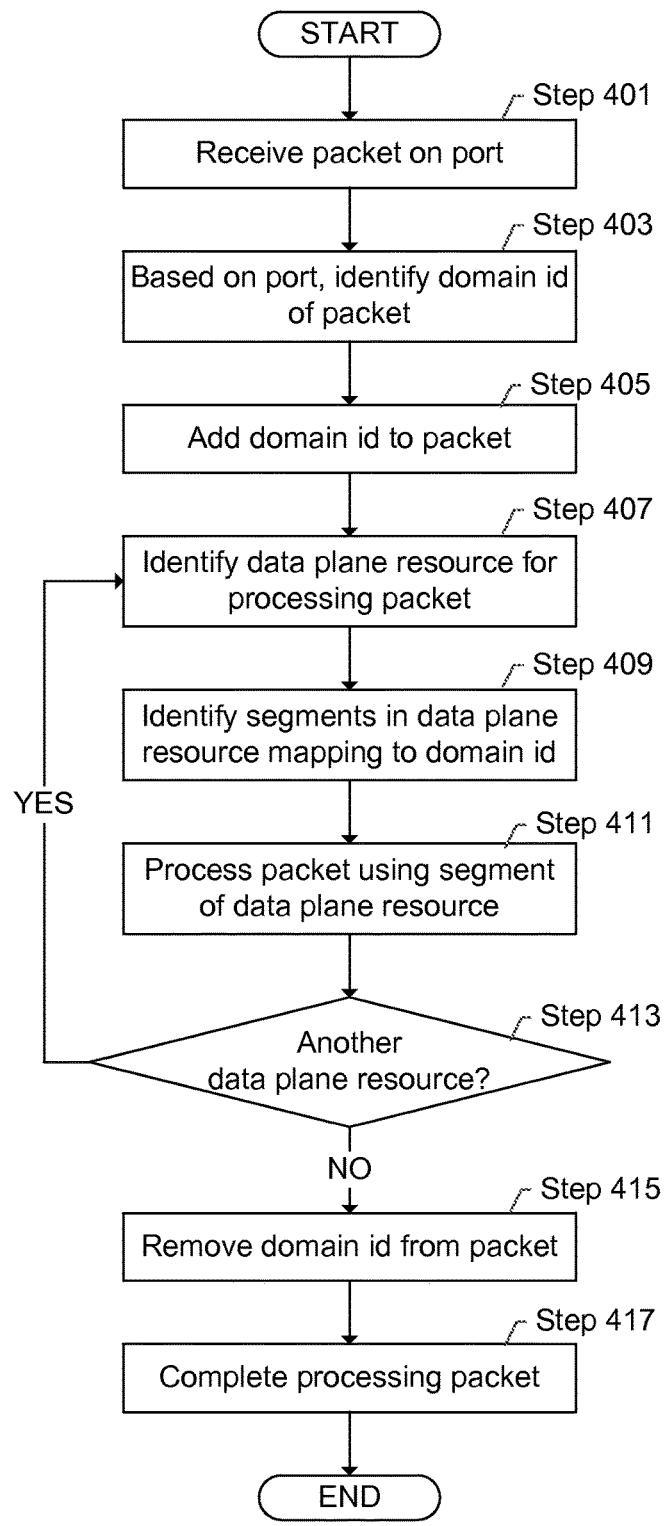

FIGS. 2, 3, and 4 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart for configuring the hardware data plane resources in accordance with one or more embodiments of the invention. The steps of FIG. 2 may be performed by one or more components of FIG. 1. For example, the Steps of FIG. 2 may be performed by at least one network processor. In particular, the Steps of FIG. 2 may be performed by dedicated hardware, or by software, such as the data plane system manager, executing on the network processor.

In Step 201, a new domain data plane request is received in accordance with one or more embodiments of the invention. The new domain data plane request may be directly or indirectly received, for example, from the data plane system manager. For example, as part of creating or migrating a new virtual machine to a host, a control operating system and/or data plane system manager may directly or indirectly allocate resources on the host to the virtual machine, which is represented as a domain. With respect to the data plane, the data plane system manager may receive a software request, such as a system call, from a control virtual machine.

The new domain data plane request may include an instruction, a domain identifier of the new domain, and an amount of each hardware data plane requested with an identifier of the corresponding hardware data plane resource. The request may be defined at various levels of specificity. For example, the request may specify only a number of egress ports and a general identifier of egress ports. Alternatively, the request may include identifiers of specific egress ports that should be allocated to the domain. By way of another example, the request may include identifiers of hardware network processors, and, for each hardware network processor, the request may specify a number of sections in MAC table in the corresponding hardware network processor (e.g., five hundred entries from the MAC table on network processor 1, two hundred entries from the MAC table on network processor 2 . . . ). As shown, the requested hardware data plane resources may span multiple hardware network processors. Further, the request may explicitly or implicitly specify that the hardware data plane resources of multiple hardware network processors should be used. For example, the request may only specify the amount of hardware data plane resource requested, whereby the amount is greater than an amount of available hardware data plane resource.

In Step 203, the domain data plane request is parsed in accordance with one or more embodiments of the invention. Parsing the request includes separating the request into component parts, whereby each part is an identifier of a domain, an identifier of an amount, an identifier of a hardware data plane resource, or another identifier. The parsing may be performed by searching for delimiters between component parts, or based on relative locations in the request between component parts of the request. Other techniques may be used for parsing a request without departing from the scope of the invention.

In Step 205, a determination is made whether the request is valid. In particular, a determination is made whether the request is capable of being parsed or whether the request is corrupted. Validating the request may further include confirming that the requested entity has permission to request the hardware data plane resource, such as by checking an access control list. Other techniques for validating the request may be used without departing from the scope of the invention. In Step 207, if the request is invalid, then a failure notice may be sent to the requester, or the entity making the request. The failure notice may include a request identifier and an invalid status indicator. Further, the failure notice may be sent directly or indirectly to the requester. In such a scenario, the flow may proceed to end after the failure notice is sent.

Continuing with FIG. 2, in Step 209, from the parsed request, the data plane resources to satisfy the request are identified in accordance with one or more embodiments of the invention. If the request identifies the particular identifiers of particular hardware data plane resources, then identifying the data plane resources includes identifying the particular resources and determining whether those particular resources are available (i.e., not allocated to another domain). If the request only specifies the type of hardware data plane resources, then identifying the hardware domain data plane resources includes determining whether local available resources exist that satisfy the request. If local available resources do not exist, the local network processor may query other network processors to determine whether sufficient resources exist on other network processors. Thus, from the network processors that respond with having sufficient resources, a set of resources may be identified.

In Step 211, a determination is made whether the requested data plane resources are on other network processors in accordance with one or more embodiments of the invention. In other words, a determination is made whether, for at least one requested resource, the requested data plane resource is on another network processor. If all data plane requested resources are local, then the flow may proceed to end and FIG. 3 to allocate the hardware domain data plane resources locally.

In Step 213, if at least one request hardware data plane resource is remote, then a data plane resource request is sent to the remote network processors to allocate the resources. The data plane resource request may be of a similar form to the new domain data plane resource request in Step 201. However, rather than specifying all requested resources, including the requested resources not on the target network processor, only the resources on the target network processor may be requested in accordance with one or more embodiments. Alternatively, the data plane resource request may be sent by forwarding the new domain data plane resource request from Step 201. Various methods that exist for inter-processor communication may be used to transmit and receive requests in accordance with one or more embodiments of the invention. When a request is received by a network processor, the network processor may allocate resources locally based on the request.

FIG. 3 shows a flowchart for allocating resources locally in accordance with one or more embodiments of the invention. The steps of FIG. 3 may be performed by one or more components of FIG. 1. For example, the Steps of FIG. 3 may be performed by at least one network processor. In particular, the Steps of FIG. 3 may be performed by dedicated hardware, or by software, such as the data plane system manager, executing on the network processor. In particular, the steps of FIG. 3 may be performed by each network processor having the local hardware data plane resource.

In Step 301, a determination is made whether the requested resources span multiple line blades in accordance with one or more embodiments of the invention. If the requested resources span multiple line blades, fabric bandwidth and fabric resources are requested in Step 303 in accordance with one or more embodiments of the invention. In one or more embodiments, the network processor automatically requests the fabric bandwidth and fabric resources based on a predefined function of the amount of the resources on the different line blades. In alternative embodiments, the request includes the amount of fabric bandwidth and fabric resources. Allocating fabric bandwidth and fabric resources may be performed, for example, by determining the number of segments needed. Determining the number of segments may be performed by dividing the amount requested by the size of each segment and rounding up to the nearest number. According to the determined number, available segments are selected in the segment identifier to domain identifier mapping for the fabric bandwidth and other fabric resources. The allocation may be performed for each resource of the fabric. Further, the allocation may be performed individually, on a per resource basis, or for multiple resources (e.g., where a segment is for multiple resources).

Continuing with FIG. 3, ports may be allocated according to the parsed request in Step 305. In particular, if the data plane resource request requires allocation of ports, then the ports are selected and allocated to the new domain. Selecting and allocating ports may be performed in a same or similar manner to selecting and allocating fabric resources. For example, the number of segments needed may be determined. Determining the number of segments may be performed by dividing the amount requested by the size of each segment and rounding up to the nearest number. If the size of each segment is one port, then the number of segments is the same as the number of requested ports. According to the determined number, available segments are selected in the segment identifier to domain identifier mapping for the ports. The allocation of the ports may be performed individually for each type of port (e.g., ingress and egress ports) or together for multiple ports. In other words, multiple segment identifier to domain identifier mappings may exists, where a mapping exists for each type of port. Alternatively, a single domain identifier to segment identifier mapping exists for multiple types of ports.

Similarly, in Step 307, global data plane resources are allocated according to the parsed request in accordance with one or more embodiments of the invention. In one or more embodiments of the invention, allocating the global data plane resources may be performed in a same or similar manner to allocating the fabric resources and the port resources in accordance with one or more embodiments of the invention. Specifically, the number of segments to satisfy the request may be determined and allocated in the segment identifier to domain identifier mapping.

In Step 309, a determination is made whether the allocation is successful in accordance with one or more embodiments of the invention. The allocation is successful, if, for all requested data plane resources, an available number of segments exist to satisfy the request. If the allocation is successful, then the entries are marked for the domain in Step 311 in accordance with one or more embodiments of the invention. In one or more embodiments of the invention, the segment identifier to domain identifier mapping is updated to map the allocated segments to the new domain. In one or more embodiments of the invention, rather than waiting until all resources are identified, the allocation step may include updating the segment identifier to domain identifier mapping. In such a scenario, failure of at least one allocation may have the segment identifier to domain identifier mapping updated to remove the allocation to the new domain.

In Step 313, a determination is made whether the marking is successful. If the marking or allocation in Step 309 is not successful, then the flow may proceed to Step 315 to send a failure notification to the requester. In other words, the failure notification may be sent to the requesting network processor, where the current network processor processing FIG. 3 did not receive the initial request. If the current network processor did receive the initial request, then the failure notification may be sent to the control virtual machine or to the data plane resource manager. Sending the failure notification may be performed in a same or similar manner as discussed above with reference to Step 207 of FIG. 2. If the marking and allocation is successful, then a success notification is sent to the requester in Step 317 in accordance with one or more embodiments of the invention. Sending a success notification may be performed in a manner similar to sending a failure notification, except that a success state is identified in the notification.

Once allocated, the allocated resources may be used to process new packets. FIG. 4 shows a flowchart for packet processing by a network processor in accordance with one or more embodiments of the invention. In Step 401, a packet is received on a port in accordance with one or more embodiments of the invention. In other words, a signal on the physical interconnect of the host is processed through a port.

In Step 403, based on the port, the domain identifier of the packet is determined in accordance with one or more embodiments of the invention. In other words, using the segment identifier to domain identifier mapping for ports, the corresponding domain identifier that is mapped to the segment having the port is determined. In Step 405, the domain identifier is added to the packet in accordance with one or more embodiments of the invention. For example, the domain identifier may be added to the header of the packet or metadata associated with the packet.

In Step 407, the data plane resource for processing the packet is identified in accordance with one or more embodiments of the invention. One or more segments in the data plane resource that maps to the domain identifier is identified in Step 409. The one or more segments of the data plane resource are used to process the packet in Step 411. In Step 413, a determination is made whether another data plane resource is needed to process the request. If another data plane resource is needed to process the request, then, Steps 407, 409, and 411 are repeated for the next data plane resource. In other words, in Steps 407, 409, and 411 packet processing proceeds as normal through the network processor. However, rather than using the entire data plane resource, the network processor only uses the segments of the data plane resources that are allocated to the domain. In other words, the network processor enforces the allocation and separation between the domains, such that only the portions allocated to the domain are visible to the domain. In one or more embodiments of the invention, the enforcement is performed only in the hardware and using the domain identifier in the header of the packet.

In Step 415, the domain identifier is removed from the packet in accordance with one or more embodiments of the invention. By removing the domain identifier, the domain identifier is hidden from outside the system in accordance with one or more embodiments of the invention.

In Step 417, processing of the packet completes in accordance with one or more embodiments of the invention. Processing the packet may include sending the packet to a virtual machine, sending the packet on an egress port or performing another operation.

As shown, one more embodiments facilitate the enforcement of separation of resources between domains at the data plane layer. Thus, even hardware data plane resources may be separated by virtual machines.

Figure 5:
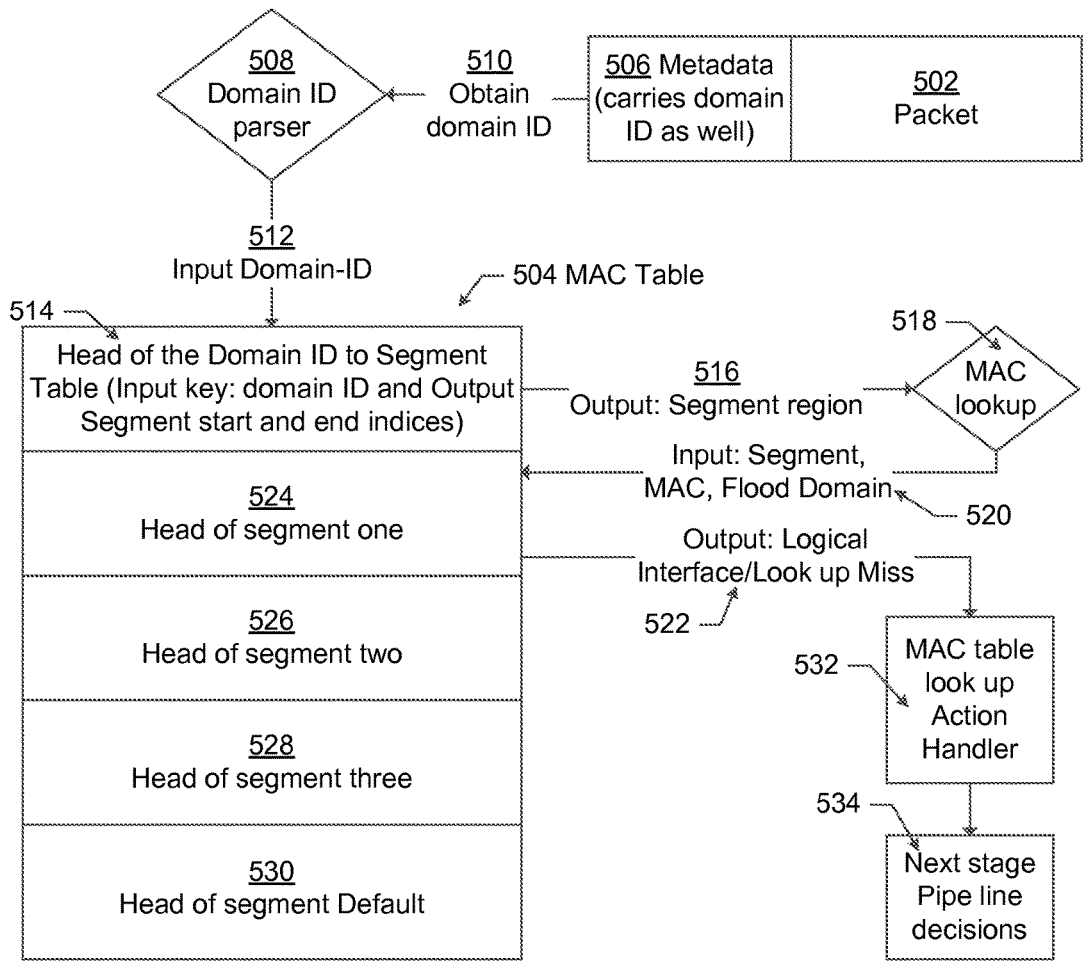
FIG. 5 shows an example in accordance with one or more embodiments of the invention.

The following example is for explanatory purposes only and not intended to limit the scope of the invention. FIG. 5 shows an example of processing a packet (502) using a MAC table (504) in accordance with one or more embodiments of the invention. As shown in FIG. 5, when a packet (502) is received, metadata (506) may be added to the packet. The metadata (506) may include the domain identifier for the packet that is determined based on the port. From the metadata, a domain identifier parser (508) may obtain the domain identifier (510) and input the domain identifier (512) into MAC table (504).

In the MAC table (504), the head (514) of the MAC table includes a domain identifier to segment identifier mapping. Thus, with the input key of domain identifier (512), the output is the segment start and end indices of the corresponding segment or segments (i.e., segment region (516)). A MAC lookup (518) is performed on only the segment regions (516) using input of a segment MAC address and flood domain (520) to obtain output of a logical interface or lookup miss (522). In the example, only segment one (524) is used because the remaining segments (e.g., segment two (526) and segment three (528)) are not allocated to the domain identifier and the domain identifier does have an allocated segment. If the packet did not have a corresponding domain or if an allocated segment did not exist for the domain, then the default segment (530) may be used.

Continuing with the example of FIG. 5, a MAC table lookup action handler (532) processes the output (522) and the packet proceeds to the next stage in the network processor pipeline decisions (534) in accordance with one or more embodiments of the invention. Thus, as shown by way of the example, one or more embodiments of the invention provide techniques and hardware structures for enforcing separation between domains.

Figure 6:
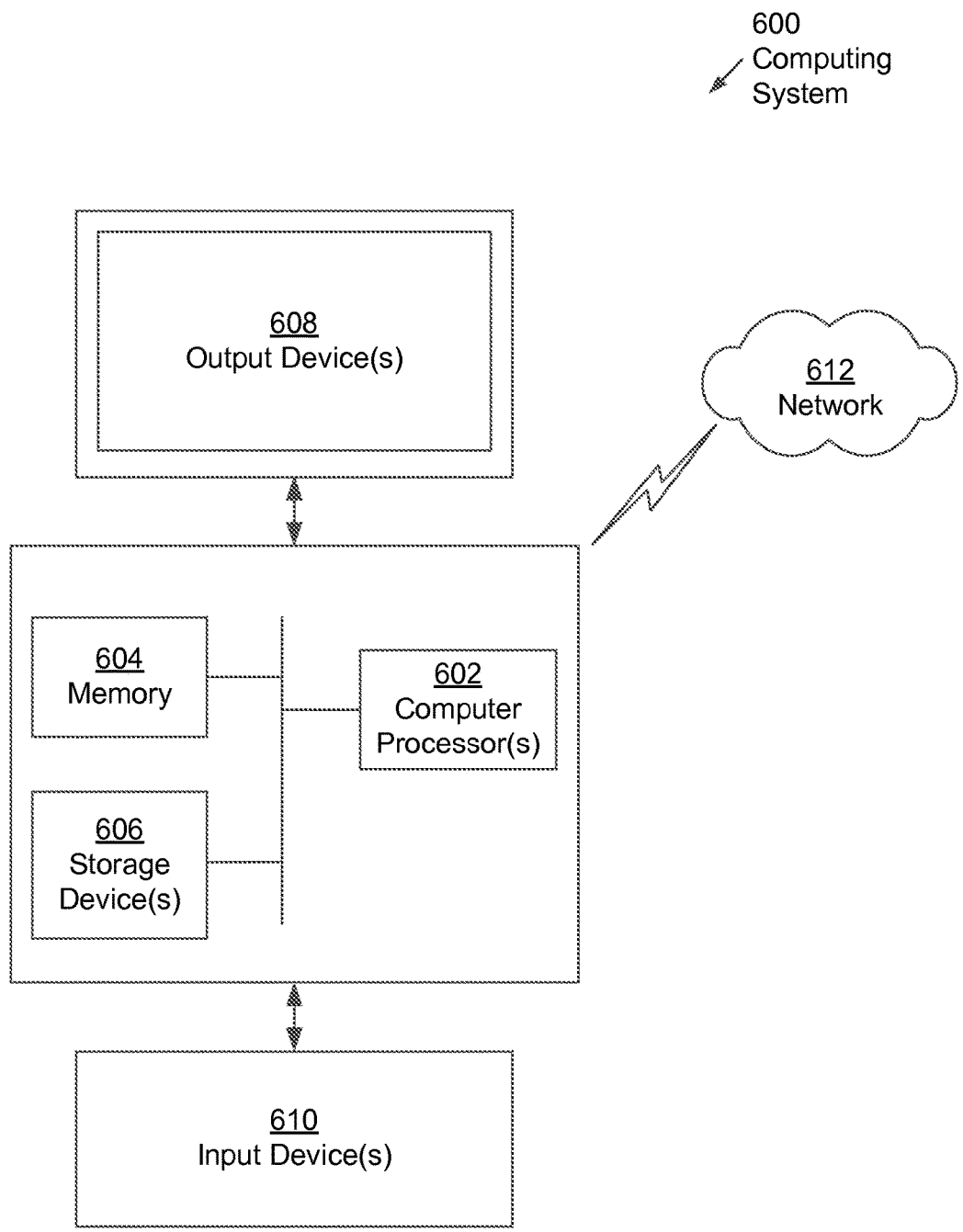
FIG. 6 shows a computing system in accordance with one or more embodiments of the invention.

Embodiments of the invention, such as the host in FIG. 1, may be implemented as a computing system. Any combination of mobile, desktop, server, embedded, or other types of hardware may be used as the computing system. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for data plane resource allocation comprising:
   receiving, for a domain, a new domain data plane request;
   selecting, to satisfy the new domain data plane request, a segment in each of a plurality of hardware data plane resources;
   reserving the segment in each of the plurality of hardware data plane resources by assigning a domain identifier of the domain to the segment;
   receiving a signal of a packet on a physical interconnect of a port;
   determining the domain identifier of the packet based on the domain identifier assigned to the segment having the port;
   adding, subsequent to the receiving the signal on the physical interconnect, the domain identifier to the packet;
   selecting the segment in at least a portion of the plurality of hardware data plane resources that is assigned the domain identifier;
   processing the packet using the segment in at least the portion of the plurality of hardware data plane resources; and
   removing, subsequent to the processing the packet using the segment, the domain identifier from the packet.

2. The method of claim 1, wherein the domain data plane request specifies a distinct number of entries for each table of a plurality of tables, wherein the plurality of data plane resources comprises the plurality of tables.

3. The method of claim 2, wherein the plurality of tables are a part of a network processor.

4. The method of claim 3, wherein the plurality of tables comprises a table comprising a first segment and a second segment, and wherein the first segment and the second segment are selected based on the distinct number of entries specified in the data plane request for the table.

5. The method of claim 4, wherein reserving the first segment and the second segment comprises storing, in the table, the domain identifier with a first segment identifier of the first segment and a second segment identifier of the second segment.

6. The method of claim 1, further comprising:
   validating the new domain data plane request.

7. The method of claim 1, further comprising:
   determining, by a network processor of a plurality of network processors, that the plurality of data plane resources span the plurality of network processors,
   sending, by the network processor, a data plane resource request to each other network processor in the plurality of network processors,
   wherein the plurality of network processors reserve the segment in each of the plurality of data plane resources.

8. A system for data plane resource allocation comprising:
   a plurality of hardware data plane resources; and
   a data plane system manager executing on a hardware network processor and configured to:
      receive, for a domain, a new domain data plane request;
      select, to satisfy the new domain data plane request, a segment in each of the plurality of hardware data plane resources;
      reserve the segment in each of the plurality of hardware data plane resources by assigning a domain identifier of the domain to the segment;
      receive a signal of a packet on a physical interconnect of a port;
      determine the domain identifier of the packet based on the domain identifier assigned to the segment having the port;
      add, subsequent to the receiving the signal on the physical interconnect, the domain identifier to the packet;
      select the segment in at least a portion of the plurality of hardware data plane resources that is assigned the domain identifier;
      process the packet using the segment in at least the portion of the plurality of hardware data plane resources; and
      remove, subsequent to the processing the packet using the segment, the domain identifier from the packet.

9. The system of claim 8, wherein the domain data plane request specifies a distinct number of entries for each table of a plurality of tables, wherein the plurality of data plane resources comprises the plurality of tables, and wherein the plurality of tables are a part of the hardware network processor.

10. The system of claim 9, wherein the plurality of tables comprises a table comprising a first segment and a second segment, and wherein the first segment and the second segment are selected based on the distinct number of entries specified in the data plane request for the table.

11. The system of claim 10, wherein reserving the first segment and the second segment comprises storing, in the table, the domain identifier with a first segment identifier of the first segment and a second segment identifier of the second segment.

12. A non-transitory computer readable medium comprising computer readable program code for data plane resource allocation, the computer readable program code comprising functionality for:
   receiving, for a domain, a new domain data plane request;
   selecting, to satisfy the new domain data plane request, a segment in each of a plurality of hardware data plane resources;
   reserving the segment in each of the plurality of hardware data plane resources by assigning a domain identifier of the domain to the segment;
   receiving a signal of a packet on a physical interconnect of a port;
   determining the domain identifier of the packet based on the domain identifier assigned to the segment having the port;

adding, subsequent to the receiving the signal on the physical interconnect, the domain identifier to the packet;

selecting the segment in at least a portion of the plurality of hardware data plane resources that is assigned the domain identifier;

processing the packet using the segment in at least the portion of the plurality of hardware data plane resources; and removing, subsequent to the processing the packet using the segment, the domain identifier from the packet.

13. The non-transitory computer readable medium of claim 12, wherein the domain data plane request specifies a distinct number of entries for each table of a plurality of tables, wherein the plurality of data plane resources comprises the plurality of tables.

14. The non-transitory computer readable medium of claim 13, wherein the plurality of tables are a part of a network processor.

15. The non-transitory computer readable medium of claim 13, wherein the plurality of tables comprises a table comprising a first segment and a second segment, and wherein the first segment and the second segment are selected based on the distinct number of entries specified in the data plane request for the table.

16. The non-transitory computer readable medium of claim 15, wherein reserving the first segment and the second segment comprises storing, in the table, the domain identifier with a first segment identifier of the first segment and a second segment identifier of the second segment.

17. The non-transitory computer readable medium of claim 12, the computer readable program code further comprising functionality for:

determining, by a network processor of a plurality of network processors, that the plurality of data plane resources span the plurality of network processors, sending, by the network processor, a data plane resource request to each other network processor in the plurality of network processors, wherein the plurality of network processors reserve the segment in each of the plurality of data plane resources.

* * * * *